United States Patent [19]

Hohn

[11] Patent Number: 4,846,624

[45] Date of Patent: Jul. 11, 1989

[54] ATTACHMENT DEVICE FOR FRONT END LOADERS

[75] Inventor: Marlin W. Hohn, Dimock, S. Dak.

[73] Assignee: MDS Manufacturing Co., Inc., Parkston, S. Dak.

[21] Appl. No.: 212,798

[22] Filed: Jun. 27, 1988

[51] Int. Cl.$^4$ .............................................. B66C 23/00
[52] U.S. Cl. ...................................... 414/723; 172/275
[58] Field of Search .............................. 414/723, 686; 172/272-275

[56] References Cited

U.S. PATENT DOCUMENTS 3,818,551  6/1974  Coughran, Jr. ................. 414/723 X
3,964,622  6/1976  Blair et al. ......................... 414/723

Primary Examiner—Robert J. Spar
Assistant Examiner—Donald W. Underwood
Attorney, Agent, or Firm—Moore & Hansen

[57] ABSTRACT

An automatic, adjustable, quick attaching loader mechanism for fastening load carrying implements to the loader arms of end loading tractors. This mechanism provides two slots for receiving transverse positioning pins located in standard positions on the rear of various type of load bearing implements such as forks or scoops. A pivoting latch serves to lock the implement securely in position while a slidable lock holds the pivot latch in position. While the security of some attaching mechanism of this type may become suspect after long and continuous use due to the enlargement of the lower slots from wear, an adjusting mechanism is provided for maintaining a secure relation between the slidable lock and the pivot latch, thereby enabling the attaching mechanism to maintain various load carrying implements in a securely locked position throughout the life of the attaching mechanism.

13 Claims, 2 Drawing Sheets

ATTACHMENT DEVICE FOR FRONT END LOADERS

BACKGROUND OF THE INVENTION

This invention relates to attachment devices mounted to the loader arms of front end loading tractors for attaching lifting or loading implements to the tractors, especially to attachment devices which do not require manual operations to secure the device to the tractor, as is oftentimes required of the tractor operator. This invention further relates to a device as described above which includes an adjusting mechanism for maintaining a securely locked relation between the attachment device and the lifting or loading implement.

The use of attachment devices is necessitated by the need for flexibility in the use of various loading devices for end loading tractors. Farm duty loaders, for example, may be required to carry loads of dirt on one occasion and bales of hay on another. To do these different jobs, different tools are required. To carry the dirt, a scoop would be the necessary implement, while for carrying bales of hay, the farmer would prefer to use forks. The problem faced when switching from one to the other is largely concerned with the fact that the implements involved are very heavy. Typically, the end loading tractor has two hinged loader arms extending therefrom, the ends of which carry the loading implements. The problem addressed by attachment devices is how to quickly and securely switch from one loading implement to another.

These attachment devices are firmly secured to the arms of the tractor as by bolts, for example. Typically, a spacing device such as a long metal bar or tube is extended between the two attachment devices in order to maintain their relative position one to another. This is because to effect easy attachment of the loading implement, the two attachment devices must be rigidly spaced from each other. Typical attachment devices are equipped with receiving means for two cross pins, a pair of which are provided in two locations on the rear of most loading implements in standard locations intended for mating with loader attachment devices. The horizontal pins are also typically spaced apart in standard spacing arrangement for attachment to various attachment means.

There are many varieties and styles of attachment devices available for use with front end loaders. Among these are those disclosed in U.S. Pat. Nos. 4,436,477, 3,985,249, 3,964,622, and 3,807,769, as well as German Pat Nos. 1,277,608 and 1,164,323. Further, Applicant has previously filed and abandoned application Ser. No 755,304 filed July 15, 1985. Many of these patents teach various methods of automatic attachment, each differing to some degree from Applicant's, but none provides a means for maintaining the securely locked relation between the attachment device and the lifting or loading implement referred to above.

U.S. Pat. No. 4,436,477 issued to Lenertz et al. on Mar. 13, 1984 shows a quick attachment assembly provided with an externally mounted locking means which requires modifications to the horizontal pin housing found on the load lifting implement. U.S. Pat. No. 3,985,249 issued to Aker et al. on Oct. 12, 1976 teaches another externally mounted locking device requiring modifications to the horizontal pin housings found on the load lifting implement. U.S. Pat. No. 3,964,622 issued to Blair et al. on June 22, 1976 shows a configuration in some ways similar to Applicant's, yet significantly different in that it provides no means for automatic attachment of the lifting implement to the attachment assembly. U.S. Pat. No. 3,807,769 issued to Thompson et al on Apr. 30, 1974, discloses a quick hitch attachment which is in fact a very complicated mechanism with several moving, pivoting parts. German Pat. No. 1,227,608 issued to Muncke on Sept. 12, 1968 shows two pivoting portions for securing the top and bottom horizontal pins in position. Finally, German Pat. No. 1,1644,323 issued to Baas on Feb. 17, 1964 shows a latching mechanism for loading mechanisms with single horizontal pin arrangements in which the pivoting portion is held in place by a vertical rod. However, the pivot point taught therein lies below the point at which the horizontal pin is secured, and Baas fails to demonstrate how such a pivoting securement may be attained with a pivot point located thereabove.

An important problem encountered in this art which is not addressed by any of the above-noted devices is the fact that the horizontal pins which reside in the slots of the attachment mechanism gradually wear away at the seating area of the slots over long periods of use. This is especially noticeable in the lower slot where, as the amount of wear increases, the horizontal pin may be free to slide about from front to back within the slot region. This loose fit condition, or chatter, if allowed to go on unchecked, continues to grow worse over time, and the security of the fit between the attachment device and the loading implement becomes suspect and vulnerable to disengagement, with the attendant risk of accidental injury or property damage.

With this background in mind, an automatic quick attaching device for front end loaders which is simple to operate and which effectively reduces chatter has been developed.

SUMMARY OF THE INVENTION

The attachment device of this invention is particularly characterized by its capacities for automatic engagement and adjustability. This device allows a tractor driver to engage material handling implements without leaving the controls of the tractor, and it provides a mechanism for taking up slack in the main area of heavy wear, thus preventing chatter and the dangers inherent therein.

These basic objectives are achieved by providing an apparatus which mounts on the ends of the loader arms of end loading tractors. This apparatus includes one latching mechanism for each of the two loader arms and an intermediate brace connecting the two latching mechanisms, the brace serving to maintain the relative position of the two latching mechanisms. The latching mechanisms include two slots which are positioned to engage horizontal pins which are commonly placed in standard positions on the rear of most material handling implements. The mechanisms further include a means for locking these pins in place once they have been properly engaged. This locking means is automatically engaged and does not require the tractor operator to leave the controls of the tractor. However, a handle located on each latching mechanism must be manually disengaged to release the locking means.

As noted above, each latching mechanism engages two parallel pins on the back of the load carrying implement, the pins being positioned one above the other. When attaching the load carrying implement, the pair of upper pins are positioned in the corresponding upper slots first, and then the remaining lower pins are positioned in the lower slots. Securely positioning these lower pins in the lower slots activates the locking means which locks the lower pins securely in the slots. Once this locking means has been activated, the upper pins cannot be displaced from the upper slots. Thereby, the load carrying implement is securely fastened to the loader arms of the end loading tractor. Under heavy use, however, the locking means may sometimes become less secure because the lower slot of the latching mechanism tends to enlarge from the wear associated with long and heavy use. This invention provides a means for compensating for this slack condition.

The locking means includes a sliding member and a pivoting latch member. When the pivoting latch member is engaged, as when the lower pin of the load carrying implement enters the lower slot of the latching mechanism, the pivoting latch member rotates about its pivot point and the sliding member is allowed to position itself securely behind the pivoting latch member, thereby preventing further motion of the pivoting latch member. The pivoting latch member and the sliding member have relatively flat mating surfaces when they are in the locking position, the pivoting member having a flat bolt head facing onto a corresponding flat surface on the sliding member. When these two surfaces are in secure contact as when a load carrying implement is being held in position, there is no way the lower pin can vibrate beyond a very small degree within the confines of the latching mechanism. However, following long and heavy use, this lower slot may become somewhat enlarged due to simple wear, and the lower pin may be subject to a higher degree of vibration or motion within the confines of the lower slot of the latching mechanism, and chatter may ensue. With the onset of this condition, if left unchecked, as in the prior art, the wear may increase at an increasing rate. This would lead to a less secure fit within the latching mechanism, and a greater possibility of inadvertent or accidental release of the load carrying implement, which may have drastic consequences in terms of injury or property damage. The use of the simple adjustable bolt, however, permits the operator to compensate for the increased wear of the lower slot of the latching mechanism, and maintain a secure locking engagement between the latching mechanism and any load bearing implement it may be used with during the life of the latching mechanism.

These and other objects and advantages of the invention will be readily understood as the following description is read in conjunction with the accompanying drawings, wherein like reference numerals have been used to designate like elements throughout the several views.

DESCRIPTION OF THE PREFERRED EMBODIMENT

Figures 1, 2:
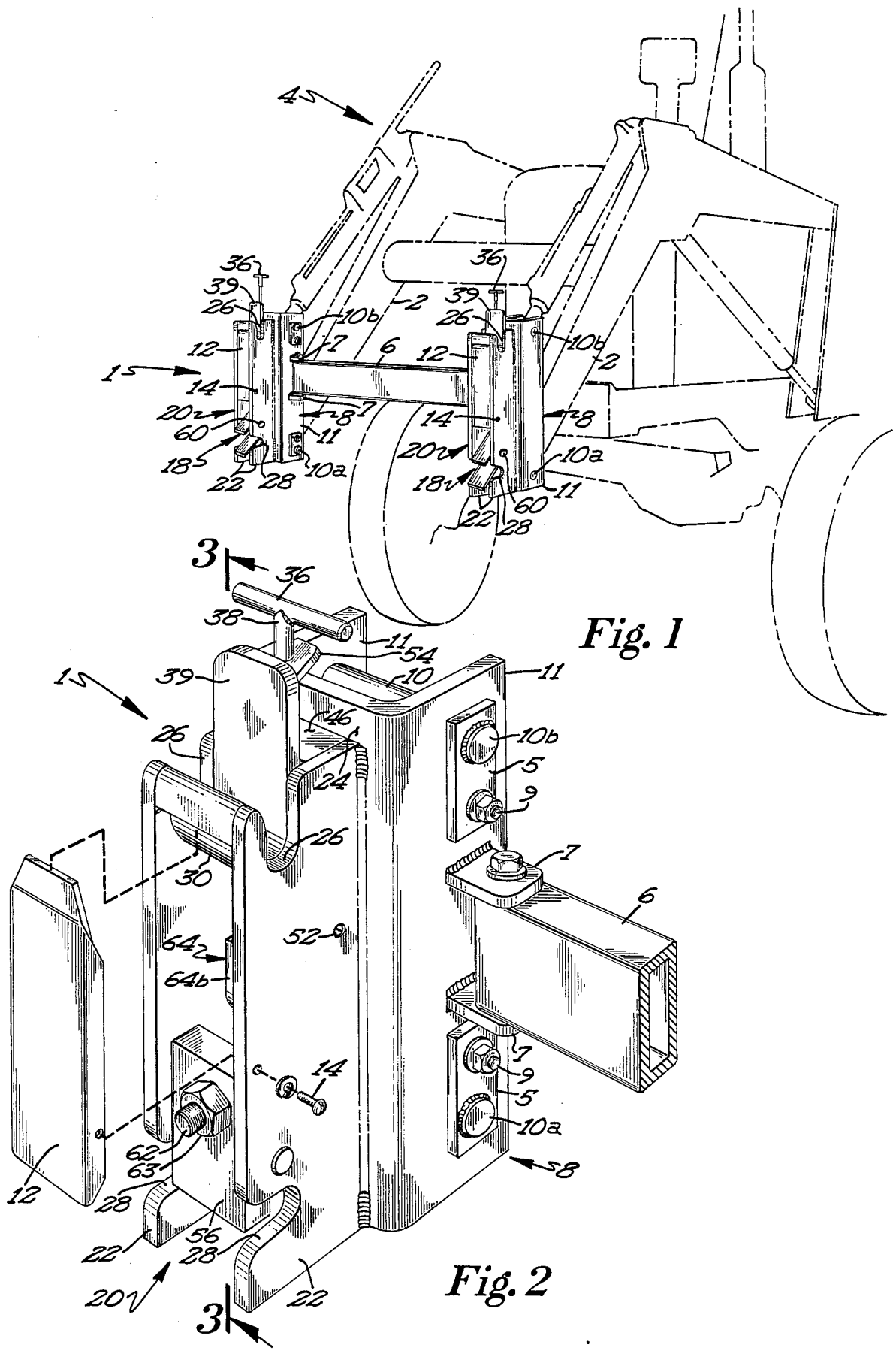
FIG. 1 is a perspective view of the attachment apparatus of this invention, including two latching mechanisms, as mounted and readied for use.
FIG. 2 is a perspective view of a latching mechanism with the front protective cover removed for clarity.

With reference to the drawings, and in particular to FIGS. 1 and 2, the attachment device or latching mechanism of the invention is generally indicated by reference numeral 1. As is shown in FIG. 1, the attachment device 1 is mounted on the end of the loader arms 2 of an end loading tractor 4. Between the two attachment devices 1 is a tubular spacing bar 6 which maintains the relative position of the two loader arms, and thus the two latching mechanisms. Spacing bar 6 is bolted between weldment ears 7 on the side wall 11 of the rearward frame assembly 8 on the rear end of each attachment device 1. The spacing of the two latching mechanisms shown in FIG. 1, as maintained by the spacing bar 6, is standard for use with and attachment of various load carrying implements designed for use with end loading tractors of the general type illustrated. For mounting to the loader arms 2 of the end loading tractor 4, the latching mechanisms 1 include a rearward frame assembly 8 which has two mounting pins 10a, 10b extending between rear side walls 11 for attachment to corresponding receiving members on the loader arms 2. The mounting pins 10a, 10b pass through apertures (not shown) on the forward end of the loader arms 2. In the preferred embodiment, these mounting pins are permanently fastened as by welding to mounting plates 5 which are removably fastened to rear side walls 11 by a mounting means such as fastening assembly 9.

As shown in FIG. 2, the latching mechanism 1 includes a removable protective shield plate 12 which serves to prevent objects from entering the latching mechanism which may interfere with its proper operation, as well as protecting hands and fingers from injury. The shield may be held in place as by screws 14 as illustrated, or by some other fastening means, such as rivets.

Figure 4:
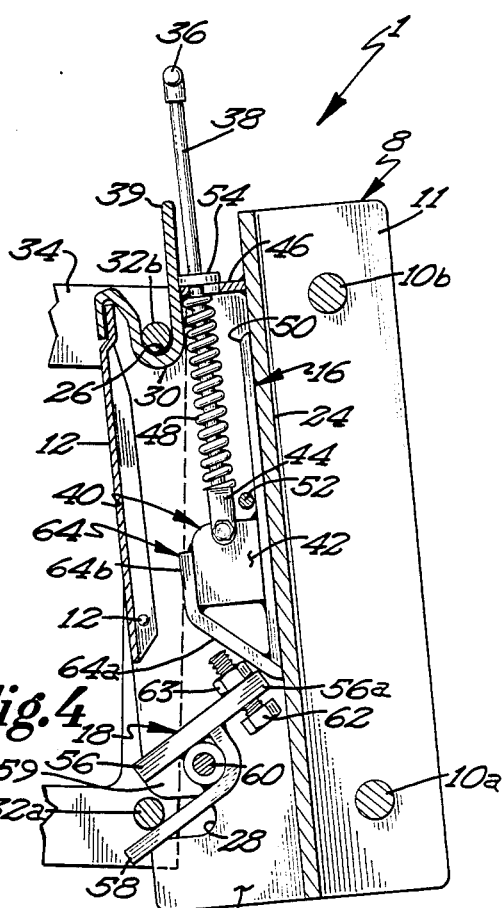
FIG. 4 is a view similar to FIG. 3, showing the upper horizontal pin of the load bearing implement positioned in the upper slot of the latching mechanism, and the lower horizontal pin just prior to engaging the locking means of the latching mechanism.
Figure 5:
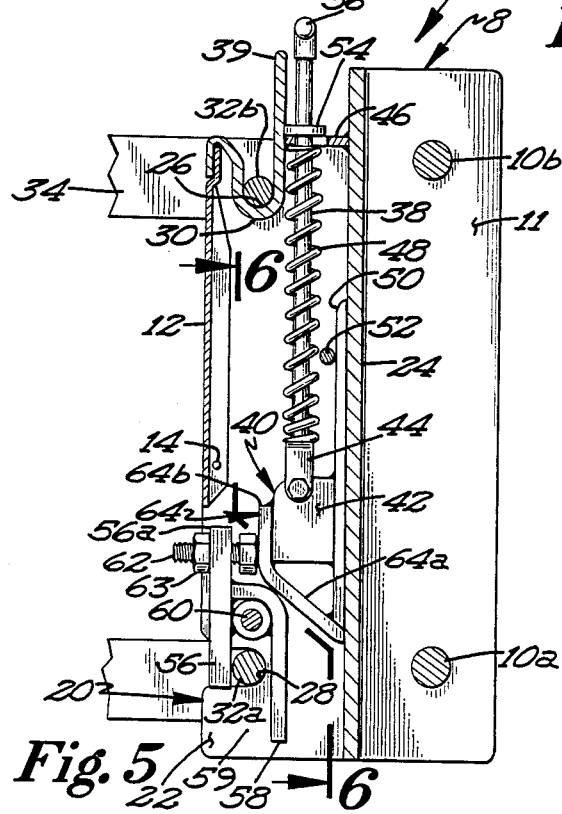
FIG. 5 is a view similar to FIGS. 3 and 4, showing the latching mechanism after it has fully and securely engaged both the horizontal pins of the load bearing implement in the locked position.

The construction and operation of the latching mechanism is best described with reference to FIGS. 3-5. As shown, there are two essential moving components included in the latching mechanism 1, a sliding member or slidable locking means 16 and a pivoting latch member or pivot latch 18. These are housed within a forward frame assembly 20 which includes two opposed side plates 22 welded to a vertical rear wall 24 of rearward frame assembly 8. The side plates have corresponding upper grooves 26 and lower grooves 28 which, when combined in the forward frame assembly 20, define slots. The upper slot is further defined by the upper slot guard 30, which may simply be a piece of sheet metal sized to fit between the two side plates 22 and formed to follow the contours of the upper grooves 26. The upper slot guard 30 also serves to reduce enlargement of the upper slot due to wear of the upper grooves 26, thereby helping to maintain the functionality of the latching mechanism. The slots are positioned to mate with the transverse pins 32a, 32b attached to the mounting brackets 34 found in standard locations on the backs of most load carrying implements made for use with end loading tractors.

Figure 3:
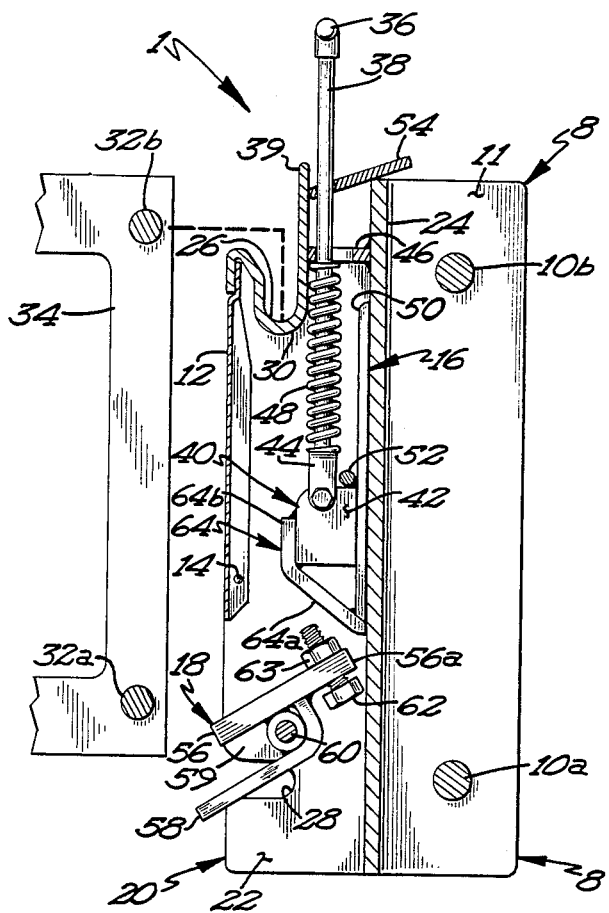
FIG. 3 is a vertical section taken along line 3—3 of FIG. 2, showing the latching mechanism set and in position to be engaged with the horizontal pins of a load bearing implement.
Figure 6:
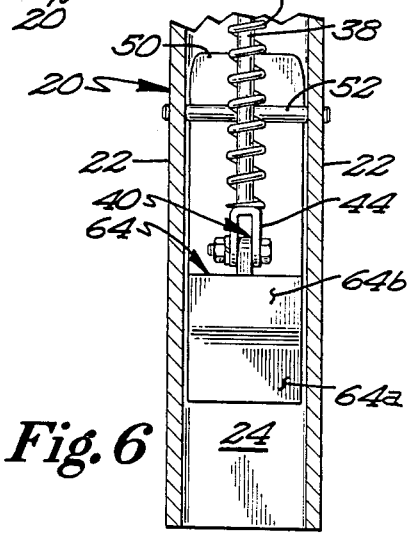
FIG. 6 is a vertical section taken along line 6—6 of FIG. 5, showing a front view of the slidable locking means with the pivot latch broken away, the slidable locking means here illustrated in the lower, locked position.

The sliding member 16, which is mounted so as to slide up and down along vertical rear wall 24, is shown in FIG. 3 in a fully upwardly retracted position. To place the sliding member 16 in the fully upwardly retracted position, an operator must first pull up on the handle portion 36 which is attached to lift rod 38. As is best shown in FIG. 6, the lift rod 38 is further attached to a locking portion 40 which includes a clevis 44 to which is welded lift rod 38, and which is also pivotally attached as by a bolt assembly 45 to a body or connecting plate 42. The lift rod 38 extends outwardly from the forward frame assembly 20, passing upwardly through an opening in the upper plate 46 at the top end of the forward frame assembly 20. Between the lift rod 38 and the upper grooves 26 is a rub bar 39 which protrudes from the top of the forward frame assembly 20. The rub bar 39 serves to protect the lift rod from possible damage when the upper transverse pin 32b is inserted in the slot defined by the upper grooves 26. As illustrated in FIGS. 3–5, the rub bar 39 may simply be an upward extension of the upper slot guard 30. The lift rod 38 also passes through a compression coil spring 48 which bears against the upper plate 46 on one end and the locking means clevis 44 on the other. The compression coil spring 48 tends to bias the locking portion 40 downwardly from the top end of the forward frame assembly 20. The locking portion 40 is limited to longitudinal movement along the vertical axis of the lift rod 38 by means of a flat guide plate 50 and a guide pin 52, which further limits the range of upward motion of the locking portion 40 at the point where it comes into contact with the connecting plate 42. Once the operator has positioned the sliding member 16 in the fully retracted, upper position, he must lock it there in order to position the pivoting latch member 18 in the proper receiving position. To do this, the operator, while holding the handle portion 36 in the fully retracted position, rotates the retaining tab 54 through a 90° angle from the position shown in FIGS. 4 and 5 to the secure position shown in FIG. 3. The retaining tab 54 secures the lift rod 38 in position through frictional engagement, although notches may also be cut on the lift rod 38. With the lift rod 38 securely upwardly retained by the retaining tab 54, thereby securely holding the locking portion 40 at an elevated position to permit free rotation of the pivot latch 18 between open and closed positions, the pivot latch may be pivoted to allow for engagment with a load carrying implement.

The pivot latch 18 includes a first arm 56 and a second arm 58 formed to define therebetween a U-shaped receiving slot 59. The assembly pivots about a cross pin 60 extending between the side plates 22. The cross pin 60 is located at the end of the receiving slot 59, with the first arm 56 including an extension 56a extending beyond the pivot point or cross pin, the cross pin 60 being interposed between the first arm 56 and the second arm 58.

Over the course of time, the lower grooves 28 of the side plates 22 tend to enlarge from wearing against the lower transverse pins 32a of the load carrying implements. This tendency affects the ability of the latching mechanism to securely hold the load carrying implements. Thus a slack adjusting means is provided in the form of an adjusting bolt 62 and nut 63 passing through the extension 56a of the first arm 56 of the pivot latch 18. The head of the bolt 62, protruding from the inner side of the first arm extension 56a, is flat, and bears against the flat portion 64b of the cam plate 64, maintaining the pivot latch 18 in the locked position. As the lower grooves 28 enlarge, the fit between the head of the bolt 62 and the flat surface 64b of the cam plate 64 becomes less snug and secure, and chatter develops, making the latching mechanism less stable. However, the slack may be taken up by loosening the nut 63, adjusting the bolt 62, and retightening the nut 63, thus ensuring that the latching mechanism remains as secure as always. Adjustments to the bolt are easily made since it is readily accessible without disassembling the unit.

To disengage a load carrying implement from a set of latching mechanisms, the operator must fully retract the sliding member 16 by lifting on the handle portion 36 and setting the retaining tab 54 as shown in FIG. 3. In this position, the pivot latch 18 is free to rotate about the cross pin 60, and the operator, from the controls of the tractor, may simply withdraw the lower transverse pins 32a from the lower grooves 28 and the receiving slot 59, and then lower the loader arms 2 so as to disengage the upper transverse pin 32b from the upper slot.

To automatically engage the latching mechanism 1 with a load carrying implement, the sliding member 16 must be fully retracted and the pivot latch 18 must be located in the open position with the receiving slot 59 open to the lower slot defined by the lower grooves 28 of the side plates 22. Once they are so positioned, the retaining tab 54 may be released, or moved to the position shown in FIGS. 4 and 5. The sliding member 16 will now be biased against the pivot latch 18 by the coil spring 48, maintaining the pivot latch 18 in the open position. The first arm extension 56a of the pivot latch will be in contact with the slanted surface 64a of cam plate 64. Engagement of the latching mechanism 1 with the load carrying implement is accomplished by aligning th upper slot formed by the upper grooves 26 and the upper slot guard 30 with the upper transverse pin 32b of the load carrying implement and inserting the upper transverse pin 32b in the upper slot. Next the tractor operator, working at the controls of the tractor, moves the latching mechanism 1 to the position shown in FIG. 4, with the lower transverse pin 32a engaging the receiving slot 59 of the pivot latch 18. As the operator continues to move the latching mechanism 1, the lower transverse pin 32a fully enters the lower slot, the pivot latch 18 rotates so that the first arm 56 will extend across the slot defined by lower grooves 28 and enclose the lower transverse pin 32a. The sliding member 16 is then biased by the coil spring 48 to move to the locking position as illustrated in FIG. 5. As pivot latch 18 rotates to the position shown in FIG. 5, it carries the head of adjusting bolt 62 upwardly along cam plate slanted surface 64a. This has the effect of urging the slidable locking means 16 upwardly just before being biased by the coil spring 48 into the locking position. After the locking portion 40 becomes positioned behind the pivot latch 18, the head of the adjusting bolt 62 should be flush with the cam plate flat portion 64b. If this is not the case, the slack adjusting means should be adjusted as necessary as described above. To gain access to the adjusting bolt 62 to make adjustments, simply secure the sliding means 16 in the open position using the retaining tab 54, then position the pivot latch 18 so that the first arm extension 56a is protruding from the front of the attachment device. In this position the adjusting bolt 62 and nut 63 may be easily adjusted.

It is anticipated that various changes may be made in the size, shape, and construction of the improved automatic adjustable latching mechanism disclosed herein without departing from the spirit and scope of the invention defined by the following claims.

What is claimed is:

1. A slack-adjusting automatic latching mechanism for securely attaching loading accessories to loader arms of front end loading tractors and other heavy load carrying machinery comprising:

a forward frame assembly having an upper end, said forward frame assembly including spaced apart, lateral first and second side plates, said first and second side plates being generally perpendicularly joined to a rear wall, and each said side plate having upper and lower grooves generally aligned with corresponding grooves on said other side plate, said upper and lower grooves being provided for receiving upper and lower transverse pins of the loading accessories for securing said loading accessories to the automatic latching mechanism;

a rearward frame assembly providing means for attachment to a load lifting apparatus of a front end loading tractor or other material handling machine, said rearward frame assembly contiguously fixedly attached to and projecting rearwardly from said forward frame assembly;

a pivot latch rotatably mounted about a cross pin extending between said first and second side plates, said pivot latch including a first arm and a second arm defining therebetween a receiving slot for receiving and retaining said lower transverse pin of said loading accessories after placement of said lower transverse pin within said lower grooves, said first arm having an extension with an inner side;

a slack adjusting means located on said extension of said first arm of said pivot latch whereby said pivot latch may be adjusted relative to said lower transverse pin of said loading accessories to maintain a secure locking relation between said pivot latch and said lower transverse pin; and a slidable locking means, having a body movable between a first position, for releasably retaining said pivot latch in an open position for attaching said loading accessory, and a second position for retaining said pivot latch in a closed, locked position, with said slack adjusting means of said pivot latch bearing against said body of said slidable locking means, for retaining said loading accessory, said slidable locking means further including a lift rod joined to said body for moving said body between said first and second positions, said lift rod including a handle portion extending above said upper end of said forward frame assembly and a biasing means for securing said slidable locking means securely locked in said first position to retain said pivot latch in said open position, said biasing means being movable to a release position whereby with said pivot latch in said open position and said biasing means in said release position said loading accessory is attached to the latching mechanism by aligning said upper transverse pins of said loading accessory with and positioning them in said upper grooves of said forward frame assembly, and then aligning said lower transverse pins of said loading accessory with said lower grooves of said forward frame assembly and thus with said receiving slot of said pivot latch, which, upon receiving said lower transverse pins, rotates about said cross pin, forcing said sliding mechanism somewhat upward, as the pivot latch continues to rotate, said slidable locking mechanism is biased into said lower position behind said pivot latch, thereby securing said pivot latch in said closed, locked position.

2. An automatic latching mechanism as defined in claim 1 wherein:
   said slack adjusting means includes a generally flat surface on said inner side of said extension of said first arm of said pivot latch.

3. An automatic latching mechanism as defined in claim 2 wherein:
   said body of said slidable locking means includes a cam plate for slidably mating with said pivot latch, said cam plate having a substantially flat surface portion generally parallel to and in opposed relation to said generally flat surface of said slack adjusting means in the region with which said slack adjusting means of said pivot latch bears against said slidable locking means when said pivot latch is in said closed, locked position, said cam plate further including a second surface portion for engaging said extension of said first arm of said pivot latch when said pivot latch is in said open position.

4. An automatic latching mechanism as defined in claim 3 wherein:
   said slidable locking means further includes a guide plate mounted in opposing relation to said cam plate, said guide plate arranged for sliding movement along said rear wall whereby said cam plate is maintained in proper operating relation to said extension of said first arm and said slack adjusting means of said pivot latch.

5. An automatic latching mechanism as defined in claim 4 further comprising:
   a guide pin extending between said first and second side plates and spaced apart from said rear wall, said guide plate of said slidable locking means passing between said guide pin and said rear wall and in close relation thereto, whereby said slidable locking means is further disposed to maintain proper operating relation to said extension of said first arm and said slack adjusting means of said pivot latch.

6. An automatic latching mechanism as defined in claim 5 further comprising:
   a connecting plate fixed to said slidable locking means intermediate said cam plate and said guide plate, said connecting plate further positioned to bear against said guide pin when said slidable locking means is in said first position and fully disengaged from said pivot latch, allowing said pivot latch to rotate freely between said open position and said closed, locked position.

7. An automatic latching mechanism as defined in claim 2 comprising:
   said slack adjusting means includes an adjusting bolt and nut, said bolt having a flat head, said flat head of said bolt comprising said generally flat surface, and said nut being externally accessible for adjustment of said slack adjusting means.

8. An automatic latching mechanism as defined in claim 1 further comprising:
   a rub bar mounted in a generally upright position intermediate said upper groove of said forward frame assembly and said handle portion of said lift rod, whereby said handle portion of said lift rod is protected from inadvertent contact with said upper transverse pin of said loading accessory, which contact could bend said lift rod rendering said automatic latching means inoperable.

9. An automatic latching mechanism as defined in claim 1 wherein:
said biasing means for securing said slidable locking means in a securely locked position includes a spring means.

10. An automatic latching mechanism as defined in claim 9 wherein:
said spring means includes a compression coil spring located about said lift rod bearing against an upper plate intermediate said rub bar and said rear wall, said upper plate having a hole therethrough through which passes said lift rod, said compression coil spring further bearing against a connecting member of said slidable locking means, whereby said slidable locking means is urged into said locked position behind said pivot latch.

11. An automatic latching mechanism as defined in claim 1 further comprising:
a retaining means for holding said slidable locking means in said release position whereby said pivot latch may freely rotate about said cross pin through an angle permitting engagement and disengagement of said lower transverse pin in said receiving slot of said pivot latch.

12. An automatic latching mechanism as defined in claim 1 wherein:
said cross pin is positioned intermediate said upper grooves and said lower grooves.

13. A slack-adjustable automatic latching mechanism for securely attaching loading accessories to loader arms of front end loading tractors and other heavy load carrying machinery, comprising:
a forward frame assembly having an upper end, said forward frame assembly including spaced apart, lateral first and second side plates, said first and second side plates being generally perpendicularly joined to a rear wall, and each said side plate having upper and lower grooves generally aligned with corresponding grooves on said other side plate, said upper and lower grooves being provided for receiving upper and lower transverse pins of the loading accessories for securing said loading accessories to the automatic latching mechanism;

a rearward frame assembly providing means for attachment to a load lifting apparatus of a front end loading tractor or other material handling machine, said rearward frame assembly contiguously fixedly attached to and projecting rearwardly from said forward frame assembly;

a pivot latch rotatably mounted about a cross pin extending between said first and second side plates, said pivot latch including a first arm and a second arm defining therebetween a receiving slot for receiving and retaining said lower transverse pin of said loading accessories after placement of said lower transverse pin within said lower grooves, said first arm having an extension with an inner side;

a slack adjusting means located on said extension of said first arm of said pivot latch whereby said pivot latch may be adjusted relative to said lower transverse pin of said loading accessories to maintain a secure locking relation between said pivot latch and said lower transverse pin, said slack adjusting means further including a generally flat surface on said extension of said first arm of said pivot latch;

a slidable locking means, having a body moveable between first and second positions, for releasably retaining said pivot latch in an open position for attaching said loading accessory, or in a closed, locked position, with said slack adjusting means of said pivot latch bearing against said body of said slidable locking means, for retaining said loading accessory, said slidable locking means further including a lift rod joined to said body for moving said body between said first and second positions, said lift rod including a handle portion extending above said upper end of said forward frame assembly and a spring means for securing said slidable locking means securely locked in said first position to retain said pivot latch in said open position, said body further including a cam pate;

a rub bar mounted intermediate said upper groove of said forward frame assembly and said handle portion of said lift rod; and a retaining means for holding said slidable locking means in an unengaged position whereby said pivot latch may freely rotate about said cross pin through an angle permitting engagement and disengagement of said lower transverse pin in said receiving slot of said pivot latch.

* * * * *